(12) United States Patent
Perkinson

(10) Patent No.: US 8,873,431 B1
(45) Date of Patent: Oct. 28, 2014

(54) COMMUNICATIONS SYSTEM AND METHOD FOR MAINTAINING TOPOLOGY IN A VLAN ENVIRONMENT

(75) Inventor: David Perkinson, Madison, AL (US)

(73) Assignee: Adtran, Inc., Huntsville, AL (US)

( * ) Notice: Subject to any disclaimer, the term of this patent is extended or adjusted under 35 U.S.C. 154(b) by 554 days.

(21) Appl. No.: 12/756,207

(22) Filed: Apr. 8, 2010

(51) Int. Cl.
*H04L 12/28* (2006.01)
*H04L 12/24* (2006.01)
*H04L 12/46* (2006.01)
*H04L 12/751* (2013.01)

(52) U.S. Cl.
CPC ............ *H04L 41/082* (2013.01); *H04L 12/243* (2013.01); *H04L 12/2424* (2013.01); *H04L 45/02* (2013.01); *H04L 12/4641* (2013.01); *H04L 41/12* (2013.01)
USPC ........... 370/255; 370/254; 370/256; 370/389; 370/392; 370/395.1; 370/396; 370/400; 370/408

(58) Field of Classification Search
None
See application file for complete search history.

(56) References Cited

U.S. PATENT DOCUMENTS

| | | | |
|---|---|---|---|
| 5,870,386 A | 2/1999 | Perlman et al. | 370/256 |
| 6,445,710 B1 | 9/2002 | Perlman et al. | 370/401 |
| 7,428,237 B1* | 9/2008 | Gai et al. | 370/395.53 |
| 7,554,994 B1 | 6/2009 | Puon et al. | 370/401 |
| 7,554,997 B1 | 6/2009 | Schlichter et al. | 370/402 |
| 7,672,319 B1 | 3/2010 | Heath et al. | 370/401 |
| 2002/0124107 A1 | 9/2002 | Goodwin | 709/242 |
| 2003/0172147 A1* | 9/2003 | Chang et al. | 709/223 |
| 2004/0174828 A1 | 9/2004 | Elie-Dit-Cosaque et al. | 370/254 |
| 2004/0218551 A1* | 11/2004 | Goldberg et al. | 370/256 |
| 2005/0013260 A1* | 1/2005 | Ramanathan et al. | 370/256 |
| 2005/0076140 A1 | 4/2005 | Fung | 709/245 |
| 2007/0008964 A1* | 1/2007 | Rose et al. | 370/389 |
| 2007/0258390 A1* | 11/2007 | Khan et al. | 370/256 |
| 2008/0101219 A1* | 5/2008 | Rose et al. | 370/224 |
| 2008/0137557 A1* | 6/2008 | Nozue et al. | 370/256 |
| 2008/0181138 A1 | 7/2008 | Dalberg | 370/256 |
| 2008/0205302 A1* | 8/2008 | Florit et al. | 370/255 |
| 2009/0185571 A1* | 7/2009 | Tallet | 370/401 |
| 2009/0274155 A1* | 11/2009 | Nakash | 370/395.53 |
| 2011/0243140 A1* | 10/2011 | Musku et al. | 370/395.53 |
| 2011/0292833 A1* | 12/2011 | Kapitany et al. | 370/254 |

* cited by examiner

*Primary Examiner* — Ayaz Sheikh
*Assistant Examiner* — Peter Chau
(74) *Attorney, Agent, or Firm* — Fish & Richardson P.C.

(57) ABSTRACT

In accordance with a non-limiting example, a communications system includes a plurality of Virtual Local Area Networks (VLAN) enabled switches interconnected together and each having a plurality of ports and configured into a plurality of VLAN's in a single topology map. The switches each comprise a processor and transceiver and configured to process and transport data packets and further comprising forwarding tables and operating in accordance with a Spanning Tree Protocol in a single topology map, for example, operating with the Rapid Spanning Tree Protocol and not having multiple topologies. When a topology changes occurs to a specified VLAN, the switches are configured to flush the forwarding tables only for the specified VLAN associated with the port of the switch whose state change caused the topology change.

18 Claims, 4 Drawing Sheets

COMMUNICATIONS SYSTEM AND METHOD FOR MAINTAINING TOPOLOGY IN A VLAN ENVIRONMENT

FIELD OF THE INVENTION

This invention relates to communications systems and related methods that use Virtual Local Area Networks (VLAN's), and more particularly, this invention relates to handling topology changes in a communications network having a plurality of VLAN's that use a Spanning Tree Protocol (STP).

BACKGROUND OF THE INVENTION

The use of VLAN's has become more commonplace in network environments. Although Multiple Spanning Tree Protocol (MSTP) provides for different domains and multiple topologies, there are instances when multiple topologies are not desirable, such as for cost considerations or other factors. A large problem with the Rapid Spanning Tree Protocol (RSTP) is that topology changes cause the forwarding tables to be flushed for all VLAN's on the switch. This is not always desirable and not necessary and it is desirable to solve this technical problem without having multiple topologies in the network environment.

SUMMARY OF THE INVENTION

In accordance with non-limiting examples, topology changes are specially handled in a network having a single topology map. In one example, if a topology change is triggered from an edge port and the other side does not send a Bridge Protocol Data Unit (BPDU), the system would only flush the VLAN associated with the port whose state change caused the topology change. If the port is configured for multiple VLAN's, a topology change would typically apply to all VLAN's configured on that port. For cases where the topology change is propagated to adjacent standard switches that do not use this special topology change algorithm, the topology change would still flush all VLAN's on the adjacent switch. If the adjacent switch contains the special topology change algorithm for maintaining topology as described in further detail below, a special packet such as a modified Ethernet packet is sent to the adjacent switch, which causes a topology change on that switch. It is only associated with the appropriate or specified VLAN's. This allows a topology change to be specific to a VLAN or a subset of VLAN's while maintaining the simple single topology of the RSTP.

In another non-limiting example, this special topology change packet is a layer 2 packet, such as an Ethernet packet for an Ethernet-connected endpoint, and communicates to the peer spanning tree instance that a topology change has occurred on a specified VLAN. This information is further communicated by the peer using the same rules as a topology change event as a BPDU would be communicated. The topology change packet is referred to as "special" because it is not part of the standard RSTP protocol and is sent and received by code modified to implement it. From the viewpoint of the layer 2 drivers such as Ethernet, it is a proper packet. If a topology change had been communicated to the peer via the topology change flag in a standard BPDU, the peer would clear all VLAN tables on the switch because the standard protocol does not provide for VLAN specific information.

In accordance with a non-limiting example, a communications system includes a plurality of Virtual Local Area Network (VLAN) enabled switches interconnected together and each having a plurality of ports and configured into a plurality of VLAN's in a single topology map. The switches comprise a processor and transceiver and are configured to process and transport data packets and further comprising a forwarding table and operating in accordance with a Spanning Tree Protocol in a single topology map, for example, operating with the Rapid Spanning Tree Protocol. The network does not have multiple topologies and is not using the Multiple Spanning Tree Protocol (MSTP). When a topology change occurs to a specified VLAN, the switches are configured to flush the forwarding tables only for the specified VLAN associated with the port of the switch whose state change caused the topology change.

In non-limiting examples, the VLAN enabled switches comprise Ethernet switches. A switch having the state change causing the topology change is configured to flush a forwarding table if the topology change was triggered from an edge port and another network segment has not sent a Bridge Data Protocol Unit (BDPU), in a non-limiting example. In yet another example, a switch is configured to apply the topology change to all VLAN's configured on a port whose state change caused the topology change if that port is configured for multiple VLAN's.

In yet another example, the switch having the state change causing the topology change is configured to communicate a topology change packet to an adjacent switch that includes a port configured for the specified VLAN having the topology change. The topology change packet includes instructions to cause a topology change for the specified VLAN. In one example, the switches comprise Ethernet switches and the topology change packet comprises an Ethernet packet.

In yet another example, the VLAN is spanned across multiple VLAN enabled switches and at least one trunk port is designated for the VLAN. The VLAN enabled switches in yet another example comprise an integrated router and switch fabric architecture. In yet another example, when the topology change occurs to a specified VLAN on a switch, the switch having the state change causing the topology change is configured to generate a topology change packet to the peer spanning tree instance indicative that a topology change has occurred on a specified VLAN and flushing of the forwarding tables occurs only for the specified VLAN associated with the port of the switch whose state change caused the topology change.

A method aspect is also set forth.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Figure 1:
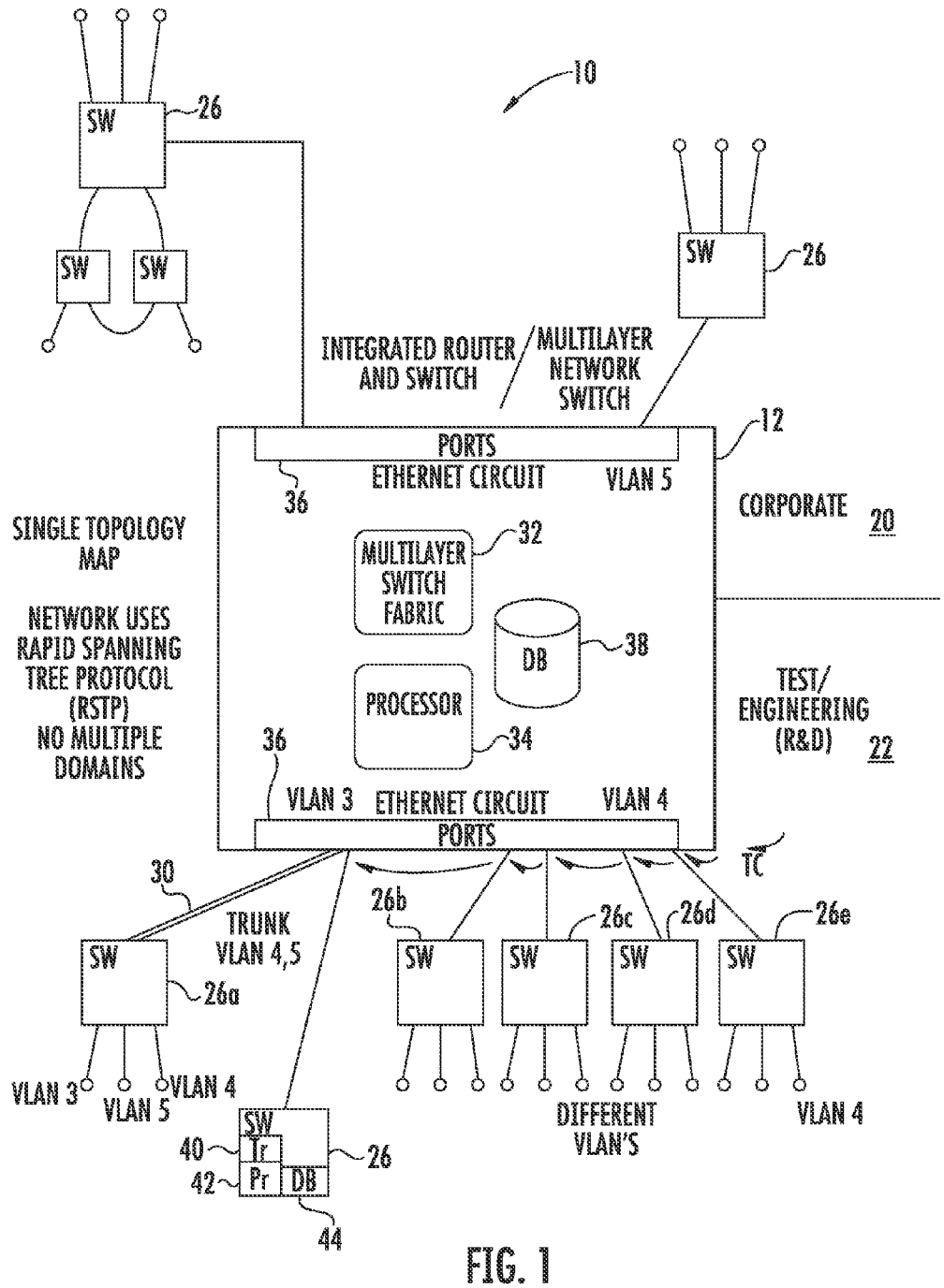
FIG. 1 is a block diagram showing two network sides as a corporate network and test/engineering (R&D) network connected together by a layer 3 switch and having one topology map and using RSTP in which the switches are configured for special handling of topology changes in accordance with a non-limiting example.

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout.

VLAN's have become more commonplace to overcome the drawbacks when switches or hubs are connected to a number of hosts or other endpoints and a large number of network elements produce one collision domain or one broadcast domain. In this scenario, collisions occur frequently and network bandwidth is wasted. In response, network designers often use an Ethernet switch, and more specifically, a layer 2 switch to partition the network into multiple smaller collision domains. This does not solve the problem of broadcasts. For example, in a cascaded star topology, in which different work group hubs are connected to a layer 2 switch, there is one large broadcast domain. Because of this large broadcast domain, routers are often used to partition this network into multiple smaller broadcast domains. As the network increases in size, however, the number of network devices (or network elements) such as hubs, routers and switches increases, leading to greater infrastructure costs. Also, when a user moves to a different work area, LAN drop plugs have to be switched to ensure the user is connected to the right hub or switch. This can be difficult to accomplish in crowded cable closets.

VLAN's have been designed to segment logically the network without physically rewiring the network. The network is segmented into smaller broadcast domains. Ports are reconfigured logically using software in the various switches. In these examples, one switch typically has several VLAN's defined through the use of multiple ports. Typically, the VLAN's are identified using a special identification number called a VLAN ID. The different stations or end devices attach to switchboards and have the same VLAN ID and active function as if they were on the same physical network segment. An administrator typically assigns the VLAN ID's manually at the port level, but this can be managed dynamically. For example, a VLAN enabled switch maintains an internal forwarding table that maps the addresses, such as MAC addresses of connected stations to the VLAN ID. Thus, if the user moves to another location, then the different VLAN ID is assigned to the port to which the host is connected. A single VLAN can span multiple switches and use trunking to allow VLAN enabled switches to be connected to form large VLAN spanning switches across the network. For example, a port on a switch could be designated a trunk port and trunk ports on different switches are connected using different trunk lines.

To aid in network functionality, Spanning Tree functionality has been implemented. Spanning Tree Protocol (STP) is link layer network protocol for layer 2 bridges such as Ethernet switches. STP ensures a loop-free topology for a bridged LAN and provides redundant links and automatic backup paths when an active link fails while avoiding bridge loops. Bridges collectively compute a spanning tree when loops are broken while maintaining access to all LAN segments. Bridges exchange the Bridge Protocol Data Unit (BPDU) frames to exchange information about bridge ID's and root paths, detect loops and enable switches to track network changes and start and stop forwarding packets to various ports as required. A BPDU typically contains information on ports, addresses, priorities and costs. A configuration BPDU is used for a spanning tree computation. In these systems, a Topology Change Notification (TCN) BPDU announces network topology changes. A TCA (Topology Change Notification Acknowledgment) acknowledges the Topology Change (TC). When a root switch receives a TCN, it sets a TC flag that is propagated to other switches that instructs them to age out their forwarding table entries. A switch port can be in 1) a blocking state where no user data is sent or received but BPDU's are still received; 2) a listening state to process BPDU's; 3) a learning state to learn source addresses from received packets as frames but does not forward frames; 4) a forwarding state to receive and send data as normal; and 5) a disabled state in which a network administrator has manually disabled a port.

The Rapid Spanning Tree Protocol (RSTP) is a refinement of STP for faster spanning tree convergence. Ports are configured as edge ports if they are attached to a LAN that has no other attached bridges. The edge ports transition directly to a forwarding state. When a bridge detects a BPDU coming to an edge port it becomes a non-edge port. Multiple Spanning Tree Protocol (MSTP) extends RSTP for virtual LANs (VLANs) and configures a separate Spanning Tree for each VLAN group and blocks all but one of the possible alternate paths within each Spanning Tree. MST uses multiple MST instances (MSTI), which use MSTI configuration messages to convey spanning tree information for each instance. Each instance is assigned a number of configured VLANs and frames as packets assigned to the VLANs. Implementation of Multiple Spanning Tree is not always desirable, however, and some networks maintain RSTP.

A technical problem occurs when a layer 3 switch performs IP routing versus layer 2 forwarding. This can occur when a switch is connected between different networks or network segments, such as a corporate network and test/engineering or R&D network. There is one topology map as one broadcast domain. RSTP is used in this example.

The normal spanning tree protocol does not address VLANs and the packets are not tagged and it is a point-to-point communication. With multiple VLAN's and one spanning tree, any VLAN's have the same tree. In some switches in this example, it is all one tree. When a topology change is made, for example, at one network, such as the corporate network, flushing occurs and if it is large network the two sides (corporate and test/engineering or R&D) are constantly flushing each other with each topology change since it is one topology having the same tree. Every time the system flushes the VLAN's, the packets from the devices are broadcast and there is much greater traffic on the network for a few seconds or longer until it settles (looking like multicast or broadcast). It is as if there is a hub again. With many topology changes occurring back and forth between the two sides the switch acts like a hub (broadcasting) and by the time the network settles down there was another topology change (and thus back to broadcasting again). Although the network is paying for and supplying a switch, the network, however, is getting a hub.

Although RSTP is beneficial, however, the topology changes cause forwarding tables to be flushed for all VLAN's on the switch in this one topology scenario. As noted before, the Multiple Spanning Tree Protocol would allow for different instances of trees with VLAN's mapped onto trees by the customer and prevent a topology change on one VLAN from flushing other VLAN's in this type of protocol. As noted before, there are instances, however, where the Multiple Spanning Tree Protocol is not desired in a network for costs or other considerations, and thus, the RSTP or standard STP is used. The system and method, in accordance with non-limiting examples, solves this topology problem without requiring multiple topologies.

FIG. 1 is a block diagram of a communications system 10 in which a layer 3 network switch 12 such as a NetVanta 1544 network device as manufactured by ADTRAN, INC. of Huntsville, Ala., operates as a layer 3 switch and performs IP routing versus layer 2 forwarding (although layer 2 functionality is included in this type of device) and is connected between the corporate network 20 and test/engineering (R&D) network 22 and forms two network sides as illustrated. In this particular example, there is one topology map. A number of typical layer 2 switches (SW) 26 are connected to network switch 20 and configured to form different VLAN's as generally illustrated as VLAN3, VLAN4 and VLAN5. Other VLAN's are included but not illustrated in detail.

In this particular example, the VLAN enabled switches include the switches 26 that are Ethernet switches as layer 2 switching devices connected to the layer 3 network switch 12. A trunk 30 is formed at the switch 12 and has configured ports for VLAN4 and VLAN5 and also VLAN3 as illustrated. As well known, each switch 26 can have multiple ports, with different ports on one switch having different VLAN's. There is one topology map as illustrated and Rapid Spanning Tree Protocol is used in this example. Each VLAN is a broadcast domain even though all VLAN's share a single topology using RSTP. Multiple Spanning Tree Protocol is not used and there are no multiple domains. Thus, this existing network does not use MSTP.

The network switch 12 in one example is an integrated router and switch fabric architecture that connects to Ethernet switches 26. VLAN3 is illustrated and the trunk port and line 30 supports the different VLAN's and switch 26*a*. The four switches at the lower right are numbered 26*b*, 26*c*, 26*d* and 26*e* and ports configured for VLAN4. In this instance, there are different IP address ranges and they tend to follow or match the VLAN's. The technical problem with RSTP is when the topology change causes the forwarding tables to be flushed for all VLAN's on the switch. The normal spanning tree in this network such as the RSTP operates with multiple VLAN's as illustrated in one spanning tree and the VLAN's have the same tree. With the network switch 12 in this example, it is all one tree.

When a topology change is made, for example, on the corporate side, flushing occurs and if it is a large network, the two sides, the corporate 20 and test/engineering 22 side and are constantly flushing each other with each topology change since it is one topology having the same tree. Every time the system flushes the VLAN's, the packets from the devices are broadcast. As a result, there is much greater traffic on the network for a few seconds (or even longer). Until this settles, the network appears to be a multicast or broadcast network and acts as if there is a hub instead of a switching device. With many topology changes back and forth, the network device or switch operates similar to a hub with broadcasting and by the time it settles down, there is yet another topology change, and thus, the network again looks like it is broadcasting again.

The claimed system and method in accordance with a non-limiting example solves this topology change problem in this network having the single topology map without using multiple topologies and without using the Multiple Spanning Tree Protocol.

It should be understood that the network switch 12 as explained before is in one example formed as an integrated router and switch fabric architecture and can be formed similar to the integrated device such as disclosed in commonly assigned U.S. Pat. Nos. 7,554,997; 7,554,994; and 7,672,319, the disclosures which are hereby incorporated by reference in their entirety. This network switch 12 includes a multi-layer switch fabric 32 and a processor 34 with Ethernet switching circuits 36 and including ports and any communications circuits necessary for operation, and a database 38 for forwarding tables. Each layer 2 switch 26 includes a transceiver 40, processor 42 and database 44 for any data and forwarding tables, if included. Only one switch 26 is shown with such components and modules for simplicity. Specific examples of the types of switches, routers and servers will be given below with reference to FIG. 4 as a network example.

Figure 2:
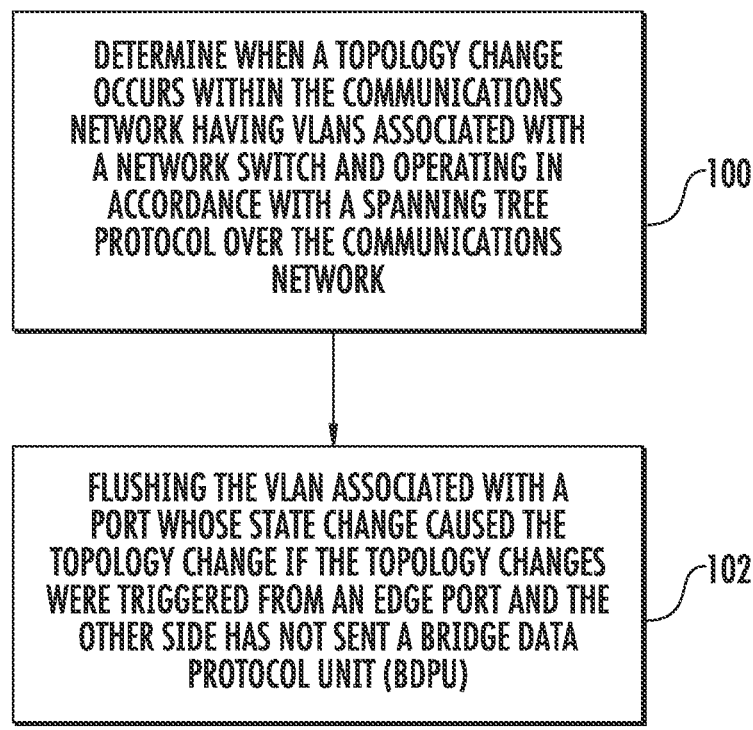
FIG. 2 is a high-level flowchart illustrating one example of the basic method for special handling of topology changes in accordance with a non-limiting example.

In accordance with a non-limiting example, special handling of topology changes occurs. As shown in the high-level flowchart of FIG. 2, a determination is made when a topology change occurs within the communications network (block 100) such as described before and shown in FIG. 1. The network has one topology map and uses a non-Multiple Spanning Tree Protocol such as the Rapid Spanning Tree Protocol. A determination is made when the topology change occurs.

The VLAN associated with the port whose state change caused the topology change is flushed if any topology change was triggered from an edge port and the other side has not sent a Bridge Data Protocol Unit (BDPU) (block 102). This is indicative that the switch has the processing capability and is configured to use the topology change algorithm as described to receive a modified packet in accordance with a non-limiting example such that only necessary VLAN forwarding tables are cleared. For example, if a topology change is triggered from an edge port and the other side does not send a BPDU, the switches are configured to flush the VLAN associated with the port whose state change caused the topology change. If the port is configured for multiple VLAN's, the topology change would apply to all VLAN's configured on that port. For cases where the topology change is propagated to adjacent switches, the topology change will flush all VLAN's on the adjacent switch; but, if the adjacent switch is functional and configured to operate with the same topology change algorithm as described, a special topology change packet, such as an Ethernet packet, is sent to the adjacent switch to cause a topology change on that switch that is only associated with the specified VLAN. This solution allows a topology change to be specific to a VLAN or a subset of VLAN's while maintaining the simple, single topology of RSTP.

For example, in this non-limiting example, this special topology change packet is a layer 2 packet, for example, an Ethernet packet for an Ethernet-connected endpoint, and communicates to the peer spanning tree instance that a topology change has occurred on a specified VLAN. This information is further communicated by the peer using the same rules as a topology change event as a BPDU would be. It is a "special" topology change packet because it is not part of the standard RSTP protocol and is sent and received by modified code. From the viewpoint of the layer 2 drivers, such as the Ethernet, it is a proper packet. If the topology change had been communicated to the peer via the topology change flag in a standard BPDU, the peer will clear all VLAN tables on the switch because the standard protocol does not provide for VLAN-specific information.

Figure 3:
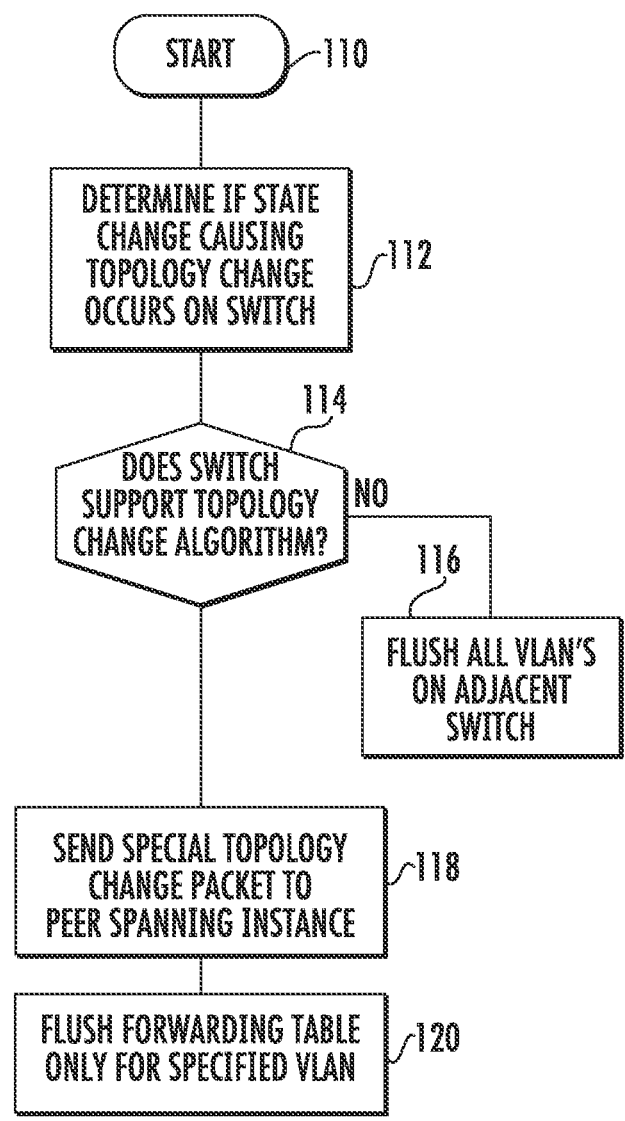
FIG. 3 is another high-level flowchart showing special handling of topology changes in accordance with a non-limiting example.

FIG. 3 is an example of a more detailed flowchart. The process starts (block 110) and a determination is made if a state change causes a topology change to occur on a switch having the VLAN (block 112). A determination is made if the adjacent switch having the VLAN supports the VLAN topology change algorithm as described (block 114). If not, then the VLAN's are flushed on the adjacent switch (block 116). If the adjacent switch supports the VLAN topology change algorithm as described, the special topology change packet is sent to the peer spanning tree instance (block 118) and the tables are flushed only for the specified VLAN (block 120).

In the example of FIG. 1, if a topology change occurs relative to VLAN4, the special (i.e., topology change) packet, i.e., the modified Ethernet packet in this example, is transmitted (shown by the arrows). The packet data has instructions that this change will act as a topology change only for VLAN4 and will flush VLAN4 on that group trunk line 30 (and VLAN5 depending on configuration such as if interoperable). There is still only one spanning tree, but the drawback of flushing tables all the time just because of topology changes is prevented. The topology change does not jump across VLAN's to those VLAN's that have nothing to do with the topology change.

The topology change packet as an Ethernet packet in this example is sent and indicative of the switch having the state change causing the topology change. The topology change packet is transmitted to an adjacent switch that includes a port configured for the specified VLAN having the topology change. This topology change packet includes instructions to cause a topology change for the specified VLAN. In this example, the switches are Ethernet switches and the topology change packet is an Ethernet packet that is modified, for example, by having the data part of the packet include specific instructions for this algorithm. In this example, instead of sending a topology change flag in a BPDU, the BPDU is left alone and this separate, special topology change packet is sent having data indicating there is a special event, i.e., clear VLAN4 out. This can be applied to the various switches as an intermediate step to make a single spanning tree instance not so toxic to the layer 3 forwarding environment. This operates as a fix to this single topology map and broadcast domain without the use of MSTP.

The topology change packet as a modified Ethernet packet includes the preamble, start-of-frame delimiter, MAC destination and source, and 802.1Q header with the ether type/length field, the CRC and interframe gap, and the payload data, which includes the special instructions as modified for the algorithm in accordance with non-limiting examples.

In the block diagram of FIG. 1, the network switch 12 in the example as noted before can be a NetVanta 1544 device and connect to various Ethernet switches 26 such as a NetVanta 1234 switch that could include power over Ethernet.

Figure 4:
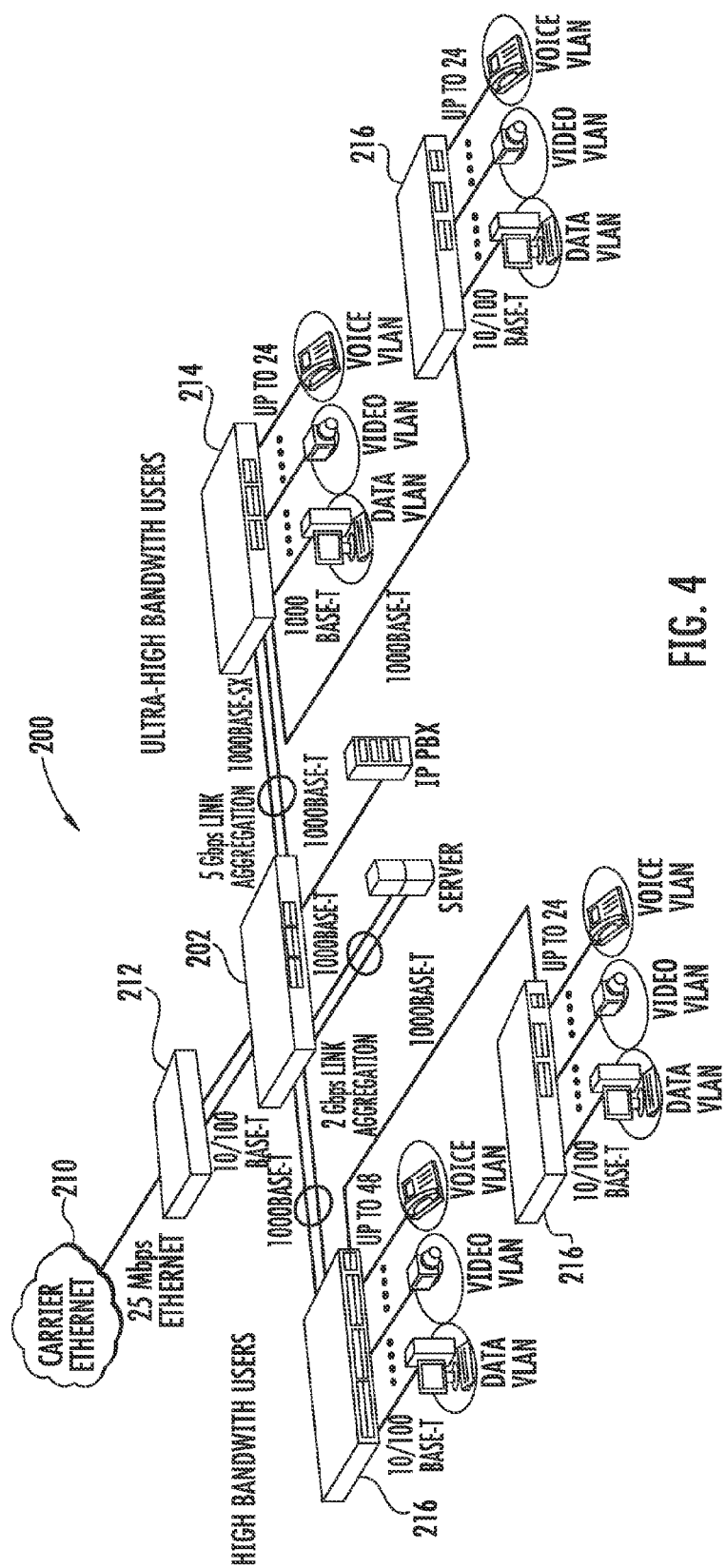
FIG. 4 is an example of a communications system that uses the method as described and incorporates various components as shown in FIG. 1 and the methodology used for special handling of topology changes such as shown in the flowcharts of FIGS. 2 and 3.

FIG. 4 is an example of a general IP network for a general description to show a more specific and larger network example to which the examples as described before can be applied. FIG. 4 is a system diagram of a communications system 200 that includes the various network components and devices as shown in FIG. 1 and other interconnected platforms, switches and service. It should be understood that the system 200 shown in FIG. 4 is only a non-limiting example of a communications system that can be used with the methodology as described. In FIG. 4, the various VLAN's are illustrated as connected to different switches and includes generally a data VLAN, video VLAN, and voice VLAN.

As illustrated, the network switch 202 is an example layer 3 switch such as the NetVanta 1544 switch manufactured by ADTRAN, INC. of Huntsville, Ala., and provides multi-layer switching and 802.1Q virtual LAN's and provides logical segmentation of the network with Gigabit uplink ports as a high bandwidth interface between interconnecting switches. It also supports both copper-based 1000Base-T and fiber based optical connections. The VLAN includes port-based VLAN's and 802.1Q tagged trunk VLAN's with voice VLAN and private VLAN edge and including 802.1X assigned VLAN's in support of up to 255 active VLAN's in a non-limiting example for this type of layer 3 gigabit Ethernet switch.

The switch 202 can be designed as an access layer or network backbone switch with enhanced Quality of Service (QOS) features and operates as an aggregation switch. It is a rack mount switch that provides 28 gigabit Ethernet ports in a non-limiting example as 24 fixed 10/100/100 Base-T Ethernet ports and 2.5 Gbps Small Form Factor Pluggable (SFFP) ports. It provides support for link aggregation and port mirroring and port-based switching, including other various features such as Rapid Spanning Tree. It supports 802.1Q trunking with up to 255 VLAN's for separate broadcast domains.

In this example shown in FIG. 4, the Ethernet network is shown generally by the network cloud 210 and connects to a router 212 such as a NetVanta 3430 router as manufactured by ADTRAN, INC. This router 212 connects to the layer 3 network switch 202 that connects to another network layer 3 switch 214 or other layer 2 switches 216 as illustrated in this non-limiting example.

Switches and other network devices as illustrated in this example run the ADTRAN Operating System (AOS) and provide standards-based, non-blocking switching and support for virtual LAN's (VLAN's), Quality of Service (QOS), and Class of Service (COS) for applications such as VoIP, link aggregation, advanced management and remote configuration capability and other functions. The devices in some aspects are fully managed layer 2 and layer 3 fast Ethernet switches and include 802.3af Power over Ethernet (PoE) enabled capabilities in some examples. The quality of service capabilities support mission critical applications such as VoIP. A WiFi access controller could be included this network configuration and manages a plurality of Wireless Access Points (WAP's) in another example. These Ethernet switches can support layer 2, 802.1p Class of Service (COS) and weighted round robin and strict priority queuing for traffic prioritization. At layer 3, a multi-service router supports various markings and class-based weighted fair or low latency queuing.

As noted before, layer 2 switches can be stackable PoE switches with gigabit uplinks. In one non-limiting example, a Wireless Access Point (WAP) uses a NetVanta 150 wireless access point (WAP) or NetVanta 1300 with WiFi that provides 802.11 a/b/g radio support and Virtual Access Points (VAP's) and segments wireless networks together. All-in-one switch-routers perform services such as switching, IP routing, firewall, Virtual Private Networking (VPN), and 802.11a/b/g WiFi in a single platform. A NetVanta 1335 series switch could be included in this network configuration as illustrated and integrate a modular IP access router and 24-port PoE layer 3 switch, firewall, VP and appliance and wireless access in a platform. Layer 2 switch-routers can be all-in-one access platforms such as the NetVanta series switch-routers for a cost-effective, single box approach to Voice over IP (VoIP) migration. Layer 3 switching is provided in one example for VLAN trunking and VGRP for 802.1Q VLAN functionality and provide separation of broadcast domains and functional work areas.

Any communications servers could be formed as a single chassis and provide a LAN-to-WAN infrastructure and Quality of Service (QoS) that maintains voice quality and includes a Graphical User Interface (GUI) for network set-up and facilitate installation and system administration. A communications server could allow a converged IP voice and data network with a full-function IP PBX for voice, for example, a NetVanta 7000 series.

A communications server, in one example, is an integrated communications platform and includes capability of a fast Ethernet switch with Gigabit uplinks and expansion slots for the network interface modules and voice interface modules. A IP telephone system as part of the communications network 200 as illustrated could include voice mail and multi-level auto-attendant, caller ID name/number, COS, trunk groups, music-on-hold, sales-on-hold, overhead paging, and other call options, including call coverage lists, forwarding of calls to a cell phone and email notification of voice mail. Some devices can operate as an integral SIP gateway with the appropriate FXS and FXO analog interfaces to support analog phones, fax machines, modems and credit card readers. An integrated voice mail can include 3,000 or more messages on eight ports and multi-level auto-attendant that are multi-level on eight ports such as in the example of a NetVanta 7000 series device. These devices include, in one example, a full function IP access router and an integrated state inspection firewall that protects against the Denial-of-Service (DOS) attempts. The devices include IP Sec VP and tunneling with DES/3DES/AES encryption and an SIP-aware firewall, and include T.38 support and a door relay, music-on-hold (MOH) interfaces and Voice Quality Monitoring (VQM).

In one example, SIP networking is supported between multiple locations. A business can connect multiple sites and have three or four digit dialing and local call routing and survivability and on-net calls for toll bypass. Multiple SIP trunks allow a communications server to connect to other communication servers. Remote SIP trunks can be supported and connect to all endpoints at all locations such that a user can have local voice mail and auto-attendant services. A hub and spoke SIP network can be accomplished in another example. A dedicated communications server can aggregate SIP trunks at a central location, which for qualified applications, increases the number of other communication servers that can be networked together.

A user can use an Internet Protocol (IP) phone such as an IP 700 series of telephones with different line versions and support multiple call functions. It is possible to incorporate voice mail-to-email applications and personal auto-attendant in which each phone sets up their own automatic attendant. It is also possible for the communications server to ring a series of stations and one external phone number. A communications server can include a PC-based phone manager and it is possible to incorporate an Internet Protocol (IP) soft phone to enable VoIP communications from a Windows- or Vista-based laptop or desktop PC. Through a PC-based phone manager, a user can customize phone settings.

It is also possible for a communications server to work in a multi-vendor environment and with an integrated T1-PRI trunk to consolidate separate voice lines and internet access onto a single T1 or PRI trunk. It is possible to combine the IP and analog communications and support analog trunks, analog phones, fax machines and credit card readers without the requirement for analog telephone adaptors. It is also possible to provide always-on, voice, data and high-speed data access to business resources from a remote home office using a single cable or DSL broadband connection in secure IP Sec-compliant VPN technology. A command line interface (CLI) can be used.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

What is claimed is:

1. A communications system, comprising:
a plurality of Virtual Local Area Network (VLAN) enabled switches interconnected together and each having a plurality of ports and configured into a plurality of different Virtual Local Area Networks (VLANs) in a single topology map, said switches configured to process and transport data packets, at least some of the switches each including forwarding tables for a plurality of different VLANs, wherein:
a particular switch includes both a forwarding table for a particular VLAN from the plurality of different VLANs and a forwarding table for at least one other different VLAN;
the particular switch is communicatively coupled to an edge port that is included in the particular VLAN; and
the particular switch is configured to perform a partial flush of the forwarding tables included in the particular switch only in response to receiving data from the edge port specifying a topology change and not receiving a Bridge Data Protocol Unit (BDPU) identifying the edge port, the partial flush including flushing the forwarding table for the particular VLAN and not flushing the forwarding table for one or more of the at least one other different VLANs.

2. The communications system according to claim 1, wherein said VLAN enabled switches comprise Ethernet switches.

3. The communications system according to claim 1, wherein at least one of the switches is configured to apply the topology change to all VLANs configured on a port whose state change caused the topology change when that port is configured for multiple VLANs.

4. The communications system according to claim 1, wherein at least one of the switches is configured to transmit a topology change packet to an adjacent switch that includes a port configured for a specified VLAN having the topology change, wherein the topology change packet includes instructions to cause a topology change for the specified VLAN.

5. The communications system according to claim 4, wherein said switches comprise Ethernet switches and the topology change packet comprises an Ethernet packet.

6. The communications system according to claim 1, wherein a single VLAN is spanned across multiple VLAN enabled switches and at least one trunk port is designated for the single VLAN.

7. The communications system according to claim 1, wherein a VLAN enabled switch comprises an integrated router and switch fabric architecture.

8. A method of communicating packetized data within a communications network, comprising:
receiving, by a particular switch, data from an edge port that is included in a particular Virtual Local Area Network (VLAN);
determining, by the particular switch, that the received data specifies a topology change has occurred;

identifying, from among multiple forwarding tables for a plurality of VLANs maintained by the particular switch, a forwarding table for the particular VLAN;

determining, by the particular switch, that Bridge Data Protocol Unit (BDPU) identifying the edge port has not been received by the particular switch; and flushing, by the particular switch, the forwarding table for the particular VLAN and not flushing a forwarding table for a different VLAN from the plurality of VLANs, the flushing being performed in response to determining that the data was received from the edge port and that the BDPU identifying the edge port was not received.

9. The method according to claim 8, and further comprising generating a topology change packet indicating that a topology change has occurred on a specified VLAN, wherein the topology change packet is generated to include instructions that cause another switch to flush the forwarding table for one VLAN while not flushing the forwarding table for one other VLAN.

10. The method according to claim 8, and further comprising forming VLAN enabled switches as Ethernet switches.

11. The method according to claim 8, and further comprising applying, by at least one of the switches, the topology change to a VLAN configured on a port whose state change caused the topology change when that port is configured for multiple VLAN's.

12. The method according to claim 8, and further comprising transmitting, by at least one of the switches, a topology change packet to an adjacent switch that includes a port configured for a specified VLAN having the topology change, wherein the topology change packet includes instructions to cause a topology change for a specified VLAN on that respective switch.

13. The method according to claim 12, and further comprising forming the switches as Ethernet switches and forming the topology change packet as an Ethernet packet.

14. The method according to claim 8, and further comprising spanning a single VLAN across multiple VLAN enabled switches and designating trunk ports for the single VLAN.

15. The method according to claim 8, and further comprising forming a VLAN enabled switch as an integrated router and switch fabric architecture.

16. A switch comprising:
a plurality of ports that are each configured to be assigned to one of a plurality of different Virtual Local Area Networks (VLANs);
a database that is configured to store both a first forwarding table for a particular VLAN to which at least one of the ports of the switch is assigned and a second forwarding table for a different VLAN to which a different port of the switch is assigned; and
wherein the switch is communicatively coupled to an edge port that is included in the particular VLAN and configured to perform a partial flush of forwarding tables stored in the database only in response to receiving data from the edge port specifying a topology change and not receiving a Bridge Data Protocol Unit (BDPU) identifying the edge port, the partial flush including flushing the first forwarding table for the particular VLAN and not flushing the second forwarding table for the different VLAN.

17. The switch of claim 16, wherein the switch comprises an Ethernet switch.

18. The switch of claim 16, wherein the switch is configured to configured to transmit a topology change packet that includes instructions that cause a topology change to the particular VLAN.

* * * * *

UNITED STATES PATENT AND TRADEMARK OFFICE
CERTIFICATE OF CORRECTION

PATENT NO. : 8,873,431 B1  
APPLICATION NO. : 12/756207  
DATED : October 28, 2014  
INVENTOR(S) : David Perkinson Page 1 of 1

It is certified that error appears in the above-identified patent and that said Letters Patent is hereby corrected as shown below:

In the Claims

In Column 12, In Line 30 (approx.), In Claim 18, before "transmit" delete "configured to".

Signed and Sealed this
Twenty-fifth Day of August, 2015

Michelle K. Lee
*Director of the United States Patent and Trademark Office*